UNITED STATES PATENT OFFICE.

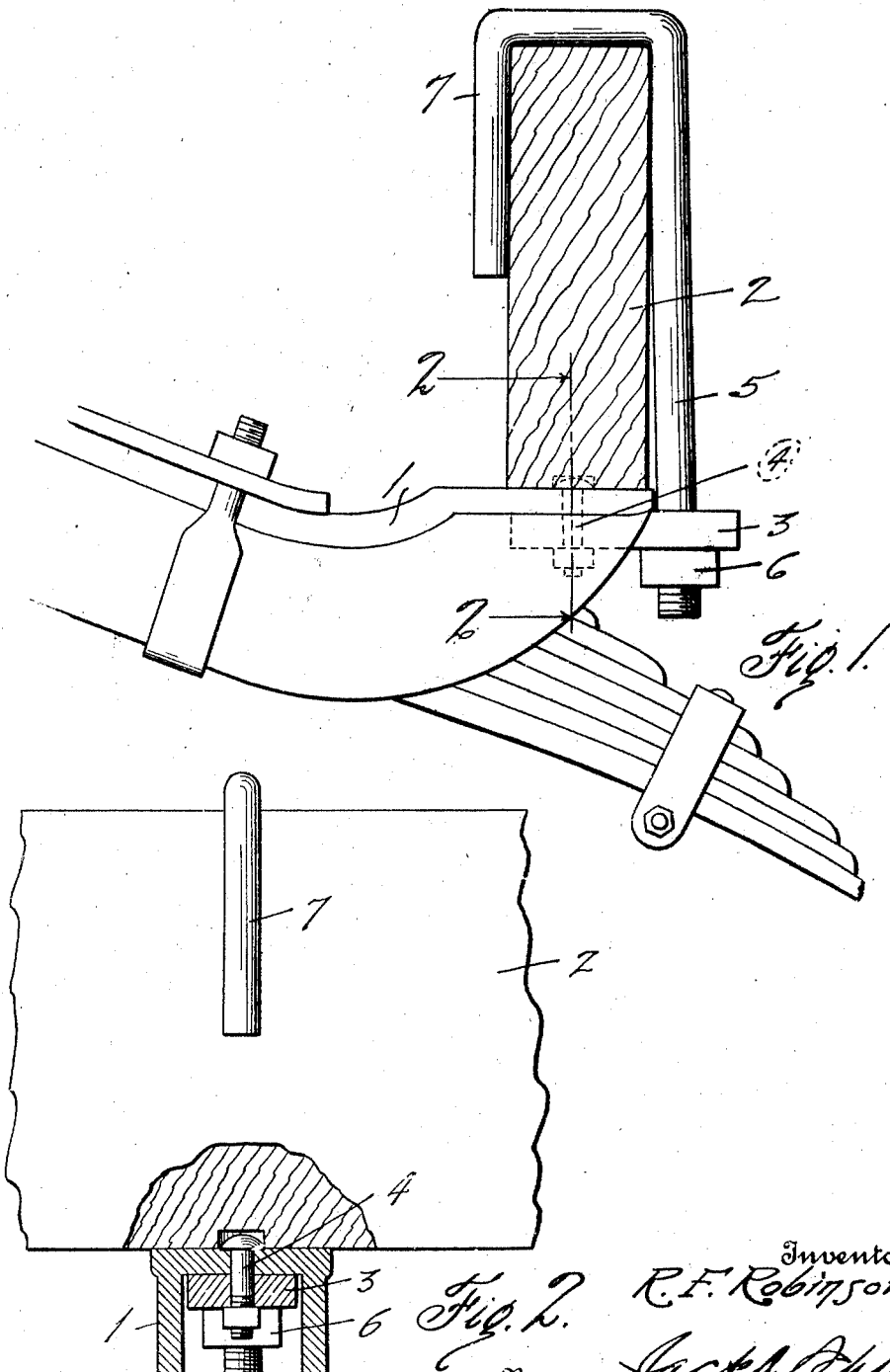

ROBERT F. ROBINSON, OF DALLAS, TEXAS.

CHASSIS CONNECTION.

1,334,714.  Specification of Letters Patent.  Patented Mar. 23, 1920.

Application filed July 7, 1919. Serial No. 308,974.

*To all whom it may concern:*

Be it known that I, ROBERT F. ROBINSON, a citizen of the United States, residing at Dallas, in the county of Dallas and State of Texas, have invented certain new and useful Improvements in Chassis Connections, of which the following is a specification.

This invention relates to chassis connections.

The particular object is to provide a simple connection for fastening the sill of a truck body on a chassis and avoid boring a hole through the sill or otherwise weakening the same. Another feature is the provision of a connection which may be easily and expeditiously applied.

In carrying out the invention a hook-shaped bolt is provided, its hook end being adapted to engage over and bite into the wooden sill of the truck body. A short bar is fastened to the chassis and receives the bolt, which is fastened by a suitable nut.

Figure 1 is a detail showing the connection applied to a sill and chassis, and

Fig. 2 is a side view of the same, portions being shown in section.

In the drawings the numeral 1 designates the rear transverse channel member of a well known style of motor vehicle chassis, and 2 one of the longitudinal sills of a truck body. It is customary to bolt the sill onto the channel member by boring a hole in the sill for the bolt; which weakens the sill at the point where it sustains the greatest load strain.

I secure a short bar 3 of metal in the end of the channel member and fasten the same with a bolt 4, having its head countersunk in the bottom of the sill. The bar 3 protrudes from member 1 and is apertured to receive the lower end of the bolt. A nut 6 bearing against the underside of the bar is screwed onto the lower end of the bolt.

The upper end of the bolt has a laterally off-set hook 7 engaging over the sill 2. It is apparent that by tightening the nut 6 the bolt 5 is drawn downwardly causing the hook 7 to bite into the top of the sill. This not only holds the sill on the member 1, but prevents its slipping or creeping. One of the particular advantages of the connection is the ease with which it is applied, which means a saving in labor and time. By eliminating bolt holes in the sill the latter is strengthened and a better job is had. The device may be quickly detached when desired.

What I claim is:

In a chassis connection, the combination with a longitudinal truck sill and the rear transverse channel member of a chassis, of a bolt having an upper hook-end engaging over the top edge of the sill, a bar fastened in the channel member and apertured to receive the lower end of the bolt, and a nut mounted on the lower end of the bolt and bearing against the underside of the bar.

In testimony whereof I affix my signature.

ROBERT F. ROBINSON.